May 12, 1931.　　　　A. J. BACON　　　　1,805,158
RESEATING LEAKPROOF FAUCET AND VALVE
Filed Feb. 28, 1930
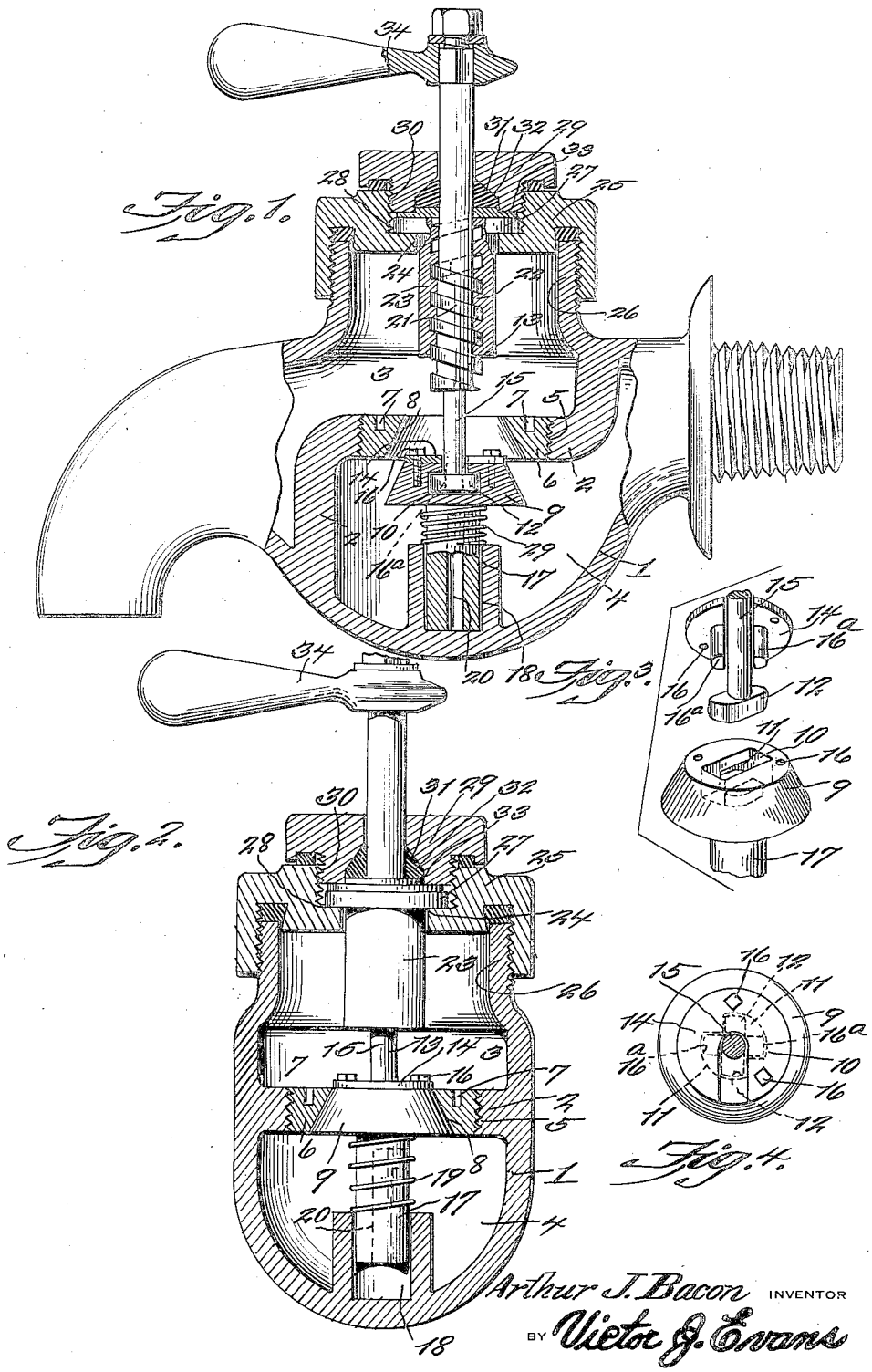
Arthur J. Bacon, INVENTOR
BY Victor J. Evans
ATTORNEY

UNITED STATES PATENT OFFICE

ARTHUR J. BACON, OF PHILADELPHIA, PENNSYLVANIA, ASSIGNOR OF ONE-HALF TO MAURICE H. CLYMAN, OF CAMDEN, NEW JERSEY

RESEATING LEAKPROOF FAUCET AND VALVE

Application filed February 28, 1930. Serial No. 432,215.

This invention relates to an improved reseating leak proof faucet and valve, especially adapted for use in connection with fluid distribution, namely such as water, steam, ammonia, etc., and the purpose of the invention is to provide a faucet and valve of such construction that the valve is capable of being re-seated at any time regardless of any pressure that may be on the line and without disassembling the various elements of the faucet and valve.

Another purpose is to provide, in an improved faucet and valve, a removable valve seat, a valve proper to cooperate therewith a mounting in the bottom of the casing of the faucet, with means in the depending stem of the valve, such as will enable any grit or other particles to be washed out of the seat automatically, so that the depending stem of the valve will be supported properly and truly in position, and in such a manner that the valve disc proper may cooperate with its seat at all times.

Another purpose is to provide in a faucet and valve, an improved loose connection with the screw stem, thereby rendering it possible to draw the valve disc toward its seat and grind it thereto, without disassembling the greater part of the faucet construction, and without shutting off the fluid, whether it be water, steam or ammonia pressure.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:

Figure 1 is a view partly in elevation and partly in section, illustrating the improved construction and mounting of the valve, showing the valve open.

Figure 2 is a vertical sectional view of the faucet or valve construction, taken at right angles to that in Figure 1.

Figure 3 is a detailed view of the loose connection between the screw stem and the disc valve.

Figure 4 is a cross sectional view of the stem 15, illustrating the disc valve in plan and illustrating in dotted lines the connections between the stem and the disc valve.

Referring to the drawings, 1 identifies the casing of the faucet, though it may be any type of valve casing, provided with a dividing wall 2, which divides the interior of the casing into two chambers 3 and 4. The wall has a threaded opening 5, which receives a metal disc 6. This disc 6 may be made of any metal, preferably Monel, and is provided with depressions 7, which may receive the ends of the arms of a spanner wrench (not shown) whereby the disc 6 can be applied or removed. The disc 6 has a valve seat 8, which may be any diameter and may have any suitable taper, and with which the disc valve 9 may cooperate, for the purpose of shutting off the flow of fluid, by closing communication between the chambers 3 and 4.

The disc valve 9 has a depression 10 preferably rectangular, and the opposite walls of this depression or cavity are undercut as shown at 11. Engaged in the cavity or depression 10 is a foot piece 12 of the screw stem 13 of the valve. This foot piece is likewise rectangular, and is sufficiently smaller than the depression or cavity as to permit of looseness of play, such as will enable the disc valve to accommodate itself to the seat 8, especially when grinding the disc valve to its seat. When the foot piece 12 is inserted in the depression or cavity, it is given a partial or quarter turn in order to permit the opposite ends of the foot piece to engage in the undercut walls of the depression or cavity, in order that when the screw stem is being operated to regrind the disc valve to its seat, the foot piece can pull against the under surface of the cut walls. In other words the under-surface of the under-cut walls constitute firm abutments for the end portions of the foot piece.

In order to retain the foot piece of the screw stem in the cavity or depression a plate 14 is provided. This plate is carried by the reduced portion 15 of the screw stem 13, and is secured at 16 to the disc valve, and this plate has on its under-surface enlargements 16a, such as will fit down in the depression or cavity and act to prevent the foot piece from turning back into position, in such a manner as would permit the disc valve being detached from the screw stem.

Depending from the disc valve is a valve stem 17 engaged in a mounting or socket 18, so as to permit the stem to rotate. Surrounding the stem 17 is a coil spring 19, which tends to urge the disc valve in a direction toward its seat.

Ordinarily where a socket is constructed on the interior of a water chamber, such as in the present valve, there would be a certain amount of grit or other foreign matter that might collect in the bottom of the socket and thereby prevent a stem from properly seating therein, therefore in the present construction the depending stem 17 has a central passage 20 which has a lateral portion at its upper end, which terminates at a point above the wall of the socket allowing any grit or other foreign matter to float up, and thereby automatically relieve the stem of any obstruction.

The screw stem 13 is provided with a plurality of threads 21 of substantial pitch, which engage with threads 22 on the interior of a sleeve 23, which is mounted at 24 in a body nut 25. This body nut is threaded on an extension 26 of the faucet casing. The sleeve 23 has a flange 27, which is seated in an annular depression 28 formed in the body nut. A packing nut 29 surrounds the upper part of the screw stem, and the reduced part of the packing nut is threaded at 30 into the depression 28. The under part of the packing nut has a cavity 31 for the reception of a packing 32, there being a plate 33 which helps to hold the packing in place. Mounted as shown on the top of the screw stem is a handle 34. It is obvious that by loosening the packing nut and holding it up the handle 34 can be moved around several times back and forth or sufficiently to grind the disc-valve to its seat, any time that necessity warrants. As previously stated the disc valve 9, while being loosely connected to the screw stem is substantially rotatable therewith, and the spring 19 in addition to holding the disc valve in its seat under ordinary closing movements of the valve, is of sufficient tension to urge the disc valve 9 toward and hold it in substantial contact with the seat during the grinding movements of the valve. Furthermore the handle can be detached from the screw stem, the packing nut removed, the sleeve 23 backed off the threads, and then the body nut can be removed, allowing a mechanic to have access to the disc having the valve seat. At such time a spanner wrench (not shown) may be inserted and the disc removed, and if necessary a new disc can be inserted. In this manner the valve or faucet is easily repaired without any great amount of expense or trouble.

It is to be noted in this construction of faucet that the pressure side of the valve is beneath the disc valve, therefore in this manner the valve has a tendency to always remain closed, thus reducing the amount of pressure on the valve stem and packing.

The invention having been set forth, what is claimed is:

1. In a combined faucet and valve, a casing having a lower pressure chamber and a fluid release chamber above, a valve seat formed in a wall dividing the two chambers, a disc valve engaging said seat in a direction from the pressure chamber and aided in its engagement with the seat by the fluid pressure, a socket formed on the bottom of the pressure chamber, the disc valve having a depending stem loose in the socket, a spring surrounding said stem and engaged between the top of the socket and the valve to urge the valve toward its seat, a screw stem rising from the disc valve and having a loose connection with the disc valve, said loose connection between the rising stem and the valve being such as will permit the disc valve to move with the screw stem when the latter is rotated when it is desired to close the valve against the seat, and means for mounting the screw stem in the top of the faucet casing, said last named means having an element, adapted to be loosened, thereby permitting the screw stem to be rotated for grinding the disc valve to its seat without shutting off the pressure.

2. In a combined faucet and valve, the combination with a casing having a lower pressure chamber and an upper fluid releasing chamber and provided with an opening in a wall between the two chambers, of a disc having a valve seat mounted in said opening, a disc valve to cooperate with the seat and provided with a depending stem, means for mounting the depending stem, a screw stem, means for rotatably mounting the screw stem in the upper wall of the casing, the disc valve having a depression rectangular, a correspondingly shaped foot piece on the lower end of the screw stem engaging in said depression of the disc valve, said engagement being loose and means to retain the foot piece in the depression and preventing the foot piece from rotating relative to the disc valve.

In testimony whereof he affixes his signature.

ARTHUR J. BACON.